United States Patent [19]

Barda

[11] Patent Number: 4,564,468
[45] Date of Patent: Jan. 14, 1986

[54] FLAME RETARDANT FOR POLYURETHANES

[75] Inventor: Henry J. Barda, North Brunswick, N.J.

[73] Assignee: Ethyl Corporation, Richmond, Va.

[21] Appl. No.: 680,930

[22] Filed: Dec. 12, 1984

Related U.S. Application Data

[63] Continuation-in-part of Ser. No. 303,055, Sep. 17, 1981, abandoned.

[51] Int. Cl.$^4$ .............................................. C09K 2/10
[52] U.S. Cl. ........................... 252/609; 260/DIG. 24; 428/921; 548/459; 548/471; 521/171
[58] Field of Search ............... 252/609; 260/DIG. 24; 428/921

[56] References Cited

U.S. PATENT DOCUMENTS

| | | | |
|---|---|---|---|
| 3,454,530 | 7/1969 | Case et al. | 528/288 |
| 3,565,812 | 2/1971 | Anderson et al. | 252/182 |
| 3,585,185 | 6/1971 | Levis, Jr. et al. | 536/18.2 |
| 3,639,541 | 2/1972 | Austin et al. | 260/952 |
| 3,639,542 | 2/1972 | Pizzini et al. | 260/952 |
| 3,642,646 | 2/1972 | Marcus et al. | 252/182 |
| 3,676,376 | 7/1972 | Svoboda et al. | 521/171 |
| 3,917,642 | 11/1975 | Wolford et al. | 260/DIG. 24 |
| 3,989,653 | 11/1976 | Baldino et al. | 521/171 |
| 3,997,511 | 12/1976 | Batzer et al. | 260/DIG. 24 |
| 4,401,778 | 8/1983 | Barda et al. | 524/89 |

FOREIGN PATENT DOCUMENTS 993451 7/1976 Canada .

OTHER PUBLICATIONS

Chem. Abstracts Index, 1967–1971, p. 24167S.
Spatz et al., "Ind. and Eng." Chemical Res. and Dev., 8, No. 4, pp. 397–398, (1969).

*Primary Examiner*—Richard D. Lovering
*Attorney, Agent, or Firm*—Donald L. Johnson; John F. Sieberth; Joseph D. Odenweller

[57] ABSTRACT

A reactive fire retardant mixture useful in the preparation of polyurethane foams. The mixture contains a halogenated imide-containing polyol having the formula:

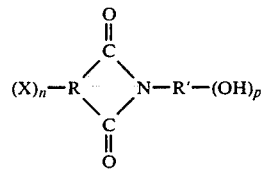

and the corresponding ether having the formula:

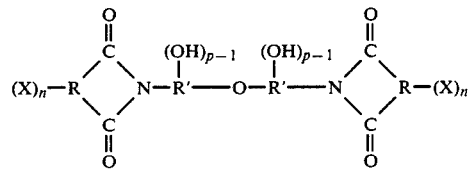

wherein R is a hydrocarbon group having the valance n+2 and is selected from the group consisting of benzene groups, naphthalene groups and alicyclic hydrocarbon groups containing 5 to 10 carbon atoms, R' is an aliphatic hydrocarbon group containing 3–12 carbon atoms, X is selected from the group consisting of bromine and chlorine, n is an integer from 1–6 and p is an integer from 2–6. They are prepared by reacting an alcohol (e.g. isopropyl alcohol), a halogenated dicarboxylic anhydride (e.g. tetrabromophthalic anhydride) and an aminopolyol (e.g. 2-amino-2-ethyl-1,3-propanediol).

10 Claims, No Drawings

FLAME RETARDANT FOR POLYURETHANES

This application is a continuation-in-part of application Ser. No. 303,055, filed Sept. 17, 1981, now abandoned.

BACKGROUND

1. Field of the Invention

This invention relates to novel reactive flame retardant mixtures for use in polyurethane compositions. More particularly, this invention relates to mixtures comprising a halogenated imidecontaining polyol and the corresponding ether. The polyol and ether whether combined or taken individually demonstrate flame retardant properties.

2. Description of the Prior Art

Polyurethanes are usually obtained by the reaction of polyisocyanates with polyhydroxy compounds, such as polyethers, polyesters or glycols. The problem of the flammability of these polymer compositions has received considerable attention. A variety of compounds are known that provide satisfactory flame resistance, smoke suppression and self-extinguishing properties. These conventional flame retarding agents fall within two categories. They are either reactive or additive. The reactive compounds are incorporated into the structure of backbone of the polyurethane. Additive flame retardants are only physically incorporated into the polymerized product. The additive compounds include tris(chloropropyl)phosphate and aluminum trihydrate. Both reactive and additive flame retardant compounds may be present in the same system.

Reactive flame retardant compounds offer several advantages. They provide foams with better physical properties since they are part of the compositions molecular structure and cannot be leached or washed out.

It is known to use polyol esters of tetrabromophthalic anhydride as a reactive component in the preparation of flame retardant polyurethanes.

U.S. Pat. No. 3,642,646 discloses polyol compositions useful in preparing rigid foam compositions. These polyols comprise the reaction adducts of polyfunctional aromatic carboxylic acid anhydrides or chlorendic anhydride and polyether polyols. It specifically teaches the use of half esters based on a polyol and tetrabromophthalic anhydride.

U.S. Pat. No. 3,585,185 discloses a process for preparing ester-containing polyols by the reaction of alkylene oxide condensates of organic compounds having at least two active hydrogen atoms with a halogen-containing organic acid anhydride and an alkylene oxide.

U.S. Pat. No. 3,454,530 teaches the use of polyols useful in the preparation of rigid polyurethane foams. These polyols are prepared by the reaction of a di- or tri-alkanolamine with a cyclic anhydride of an organic dicarboxylic acid and a lower alkylene oxide.

Canadian Pat. No. 993,451 discloses halogen-substituted aromatic amide-ester polyols and their use in a flame retardant flexible polyurethane foam.

U.S. Pat. No. 3,676,376 teaches the use of polyester polyols based on tetrabromophthalic anhydride, an aliphatic dicarboxylic acid, a polyol and an aliphatic diol.

U.S. Pat. No. 3,989,653 teaches the preparation of diesters of tetrabromophthalic anhydride by the reaction product of tetrabromophthalic anhydride and a polyhydroxy compound containing at least three hydroxyl groups.

U.S. Pat. Nos. 3,565,812, 3,639,541 and 3,639,542 are directed to the preparation of halogen-containing organic acid anhydrides based on ester- and phosphorous-containing polyols.

The prior art flame retardants mentioned above are esters. They are intended for use in polyurethane compositions. They have lower hydrolytic and thermal stability than the flame retardant mixture in the present invention. In addition, production of the present halogenated imide-containing polyol and ether do not require the use of an alkylene oxide such as propylene oxide. This is advantageous because alkylene oxides are toxic, explosive and require the use of pressure equipment.

Spatz et al is "Industrial and Engineering Chemical Product Research and Development" vol. 8, no. 4, pages 397-8 (1969) teach the use of N-(2-hydroxyethyl)-tetrabromophthalimide as a flame retardant in some thermoset polymeric compositions.

None of the references are directed to the halogenated imide-containing polyols and ethers of the present invention. These prior art flame retardants are limited in application to thermoset compositions or polyurethanes and are incorporated into the structure of the polymer itself.

SUMMARY OF THE INVENTION

In accordance with the present invention, halogenated imide-containing polyols and the corresponding ether are useful in the preparation of flame retardant polyurethane foams. These polyols are prepared by reacting an alcohol, a halogenated carboxylic anhydride and an aminopolyol.

DESCRIPTION OF THE PREFERRED EMBODIMENT

The present invention relates to a reactive flame retardant mixture. A preferred embodiment of the present invention is a reactive flame retardant mixture containing components having the following general formulas:

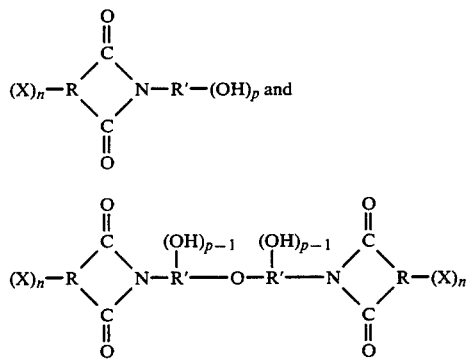

wherein R is a hydrocarbon group having the valence n+2 and is selected from the group consisting of benzene groups, naphthalene groups and alicyclic hydrocarbon groups containing 5 to 10 carbon atoms, R' is an aliphatic hydrocarbon group containing 3-12 carbon atoms, X is selected from the group consisting of bromine and chlorine, n is an integer from 1-6 and p is an integer from 2-6. X represents 1 to 6 bromine atoms, chlorine atoms or a combination thereof, including mono-, di-, tri-, and tetra-halo substituted phthalic anhydrides. The amount of each component can vary over a wide range. The exact ratio is not critical. For example the amount of the mono-imide polyol can range from as low as 0.1 weight percent up to about 99.9 weight percent and the bis-imide ether polyol can likewise range from 99.9 weight percent to as low as 0.1 weight percent. Preferably the mixture contains about 1.0-99 weight percent mono-imide polyol and 99-1.0 weight percent bis-imide ether polyol. More preferably the mixture contains about 5-95 weight percent mono-imide polyol and 95-5 weight percent bis-imide ether polyol. The major component in the mixture is believed to be the mono-imide polyol. Accordingly, in a still more preferred embodiment the mixture comprises 51-99 weight percent mono-imide polyol and 1-49 weight percent bis-imide ether polyol. These percentages are based upon the total amount of mono-imide polyol and bis-imide ether polyol in the mixture.

In a preferred embodiment of the present invention, R is benzene and R' is an aliphatic hydrocarbon group containing 5 carbon atoms. The number of hydroxy groups represented by p is 2, X is chlorine and n is 4. A more preferred embodiment of the present invention is a mixture comprising a halogenated imide-containing polyol having the formula:

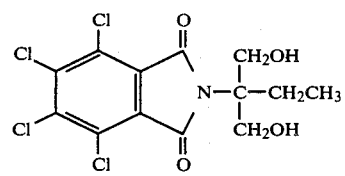

and the corresponding ether having the formula:

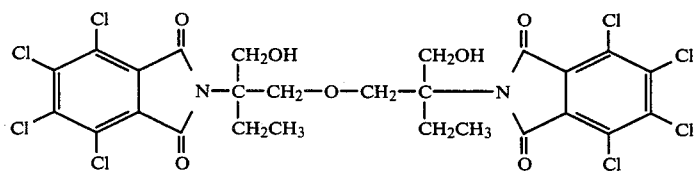

Still more preferably, R is benzene, R' is an aliphatic group containing 5 carbon atoms, p is 2, X is bromine and n is 4. The most preferred embodiment of the present invention is a reactive flame retardant mixture comprising a halogenated imide-containing polyol having the formula:

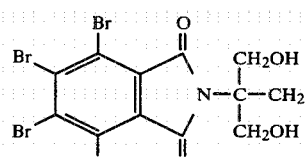

and the corresponding ether having the formula:

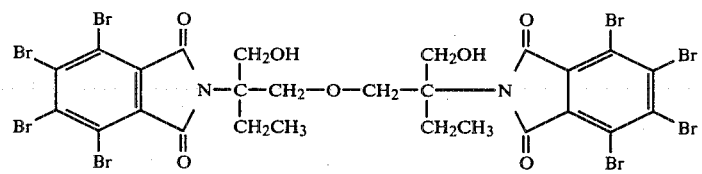

Alternatively, R may represent an alicyclic group. In this case, R is preferably 5-norbornene. R' is an aliphatic hydrocarbon group containing 5 carbon atoms. The number of hydroxy groups represented by p is 2. Preferably, X is bromine and n is 6. A preferred embodiment of the present invention is a reactive flame retardant mixture comprising a halogenated imide-containing polyol having the formula:

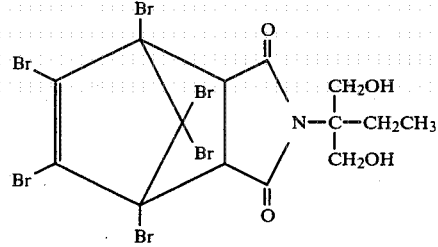

and the corresponding ether having the formula:

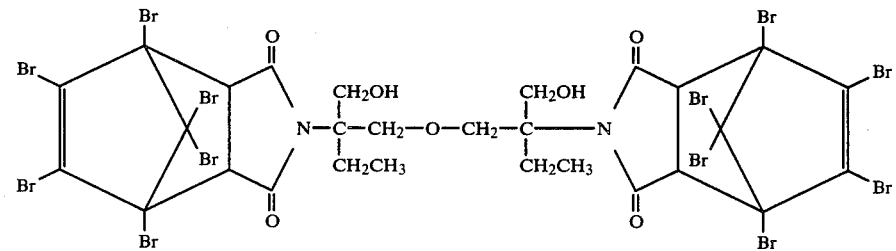

In another embodiment, R is 5-norbornene, R' is an aliphatic hydrocarbon group containing 5 carbon atoms, p is 2, X is chlorine and n is 6. One of the more preferred embodiments of the present invention is a mixture comprising a halogenated imide-containing polyol having the formula:

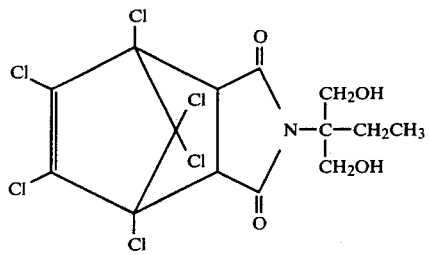

and the corresponding ether having the formula:

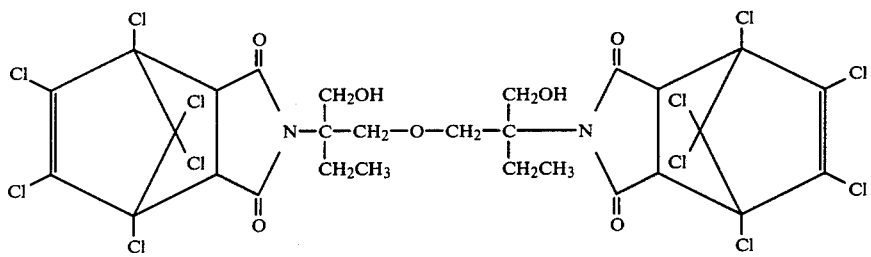

The preferred individual reactive flame retardant compounds are identical to those components of the reactive flame retardant mixture identified above. Therefore, a preferred embodiment of the present invention is a compound having the following general formula:

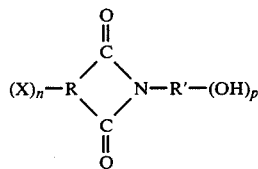

wherein R is a hydrocarbon group having the valence $n+2$ and is selected from the group consisting of benzene groups, naphthalene groups and alicyclic hydrocarbon groups containing 5 to 10 carbon atoms, R' is an aliphatic hydrocarbon groups containing 3–12 carbon atoms, X is selected from the group consisting of bromine and chlorine, n is an integer from 1–6 and p is an integer from 2–6. X represents 1 to 6 bromine atoms, chlorine atoms or a combination thereof, including mono- di-, tri-, and tetra-halo substituted phthalic anhydrides.

In a more preferred embodiment of the present invention, R is benzene, R' is an aliphatic hydrocarbon group containing 5 carbon atoms, p is 2, X is bromine and n is 4. An even more preferred embodiment of the present invention is a halogenated imide-containing polyol having the formula:

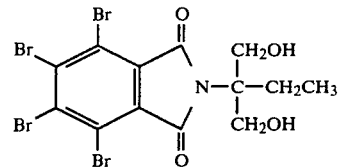

Alternatively, R may represent an alicyclic group. In this case, R is preferably 5-norbornene, R' is an aliphatic hydrocarbon group containing 5 carbon atoms, p is 2, X is chlorine and n is 6. A preferred embodiment of the present invention is a polyol having the formula:

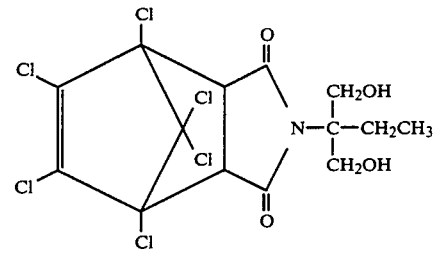

Ethers of the halogenated imide-containing polyols correspond in structure to the halogenated imide-containing polyols described immediately above. Accordingly, another preferred embodiment of the present invention is an ether having the formula:

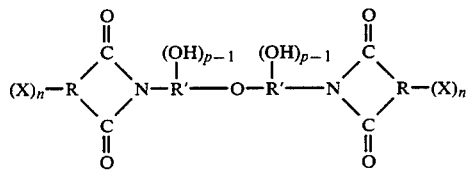

wherein R is a hydrocarbon group having the valence $n+2$ and is selected from the group consisting of benzene groups, naphthalene groups and alicyclic hydrocarbon groups containing 5 to 10 carbon atoms, R' is an aliphatic hydrocarbon group containing 3–12 carbon atoms, X is selected from the group consisting of bromine and chlorine, n is an integer from 1–6 and p is an integer from 2–6.

In a more preferred embodiment of the present invention, R is benzene, R' is an aliphatic hydrocarbon group containing 5 carbon atoms, p is 2, X is bromine and n is 4. An even more preferred embodiment of the present invention is an ether having the formula:

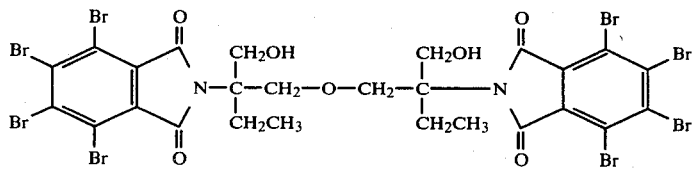

Alternatively, R may represent an alicyclic group. R is preferably 5-norbornene, R' is an aliphatic hydrocarbon group containing 5 carbon atoms, p is 2, X is chlorine and n is 6. A preferred embodiment of the present invention is an ether having the formula:

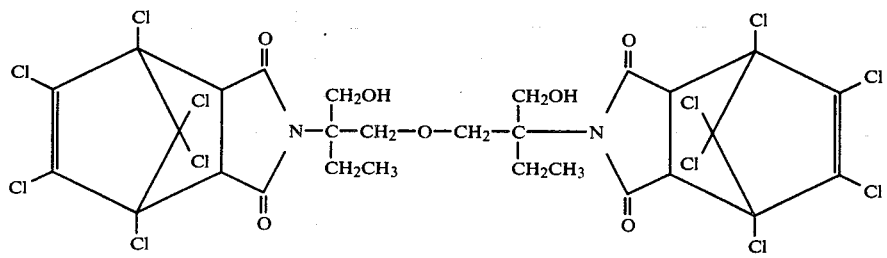

A method of producing the reaction product of the present invention involves reacting a halogenated dicarboxylic anhydride with an alcohol and an aminopolyol.

The reactants may be added concurrently or sequentially. The order of mixing the reactants does not affect the final product obtained but the intermediate formed will be different in each case.

If the halogenated dicarboxylic anhydride is initially combined with the alcohol alone, an acid-ester intermediate is formed. This intermediate is then reacted with the aminopolyol and heated to form the halogenated imide-containing polyol and the corresponding ether of the present invention.

Alternatively, if all three reactants are combined, an amide-acid intermediate results. Upon oven heating, the same halogenated imide-containing polyol and ether are formed.

Halogenated dicarboxylic anhydride compounds used in preparing the reactive flame retardant mixtures of the present invention have the structure:

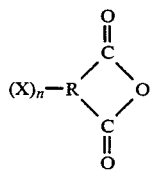

wherein R is a hydrocarbon group having the valence n+2 and is selected from the group consisting of benzene groups, naphthalene groups and alicyclic hydrocarbon groups containing 5 to 10 carbon atoms, X is selected from the group consisting of bromine and chlorine and n is an integer from 1 to 6. Typical halogenated dicarboxylic anhydrides include:
3-chlorophthalic anhydride,
4-bromophthalic anhydride,
3,6-dibromophthalic anhydride,
tetrabromophthalic anhydride,
tetrachlorophthalic anhydride,
1,4,5,6,7,7-hexachlorobicyclo(2.2.1)-5-heptene-2,3-dicarboxylic anhydride,
1,4,5,6,7,7-hexachloro-2-methylbicyclo(2.2.1)-5-heptene-2,3-dicarboxylic anhydride,
1,4,5,6,7,7-hexachlorobicyclo(2.2.1)-5-heptene-2-acetic-2-carboxylic anhydride
5,6,7,8,9,9-hexachloro-1,2,3,4,4a,5,8,8a-octahydro-5,8-methano-2,3-naphthalene dicarboxylic anhydride,
1,2,3,4,5,6,7,7-octachloro-3,6-methano-1,2,3,6-tetrahydrophthalic anhydride,
1,4-dichloro-2,3-naphthalene-dicarboxylic anhydride and
1,4-dibromo-2,3-naphthalene-dicarboxylic anhydride.

Mixtures of any of the above anhydrides may also be employed as well as mixtures of the above anhydrides and non-halogenated anhydrides. Preferably, the halogenated dicarboxylic anhydride is tetrabromophthalic anhydride.

The alcohol intended for use in making the compounds of this invention contains 1-10 carbon atoms. Examples include methanol, ethanol, isopropyl alcohol, sec-butyl alcohol, 2-pentanol, 2-heptanol, 3-propyl-2-hexanol, ethylene glycol, propylene glycol, and the like. Preferably, the alcohol is isopropyl alcohol.

Assuming the halogenated dicarboxylic anhydride is initially combined with the alcohol alone, an acid-ester intermediate is formed. The amount of the alcohol to be reacted with the halogenated dicarboxylic acid in this case should be enough to at least partially esterify the dicarboxylic acid. At least 0.3 moles of alcohol should be used per mole of halogenated dicarboxylic anhydride. However, an excess of alcohol is typically used since the alcohol may function both as a reactant and as a solvent. It is generally convenient to use a maximum of about 50 moles of alcohol per mole of halogenated dicarboxylic anhydride.

The reaction should be carried out at a temperature high enough to allow the reaction to proceed, yet not so high as to cause degradation of the reactants. The preferred temperature range is from about 25° C. to about 200° C. A more preferred temperature range is from about 50° C. to about 150° C. Usually the alcohol and halogenated dicarboxylic anhydride are brought to reflux.

The acid-ester intermediate formed by the reaction of the alcohol and dicarboxylic anhydride has the formula:

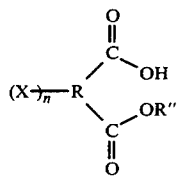

wherein R is a hydrocarbon group having the valence n+2 and is selected from the group consisting of benzene groups, naphthalene groups and alicyclic hydrocarbon groups containing 5 to 10 carbon atoms, X is selected from the group consisting of bromine and chlorine and n is an integer from 1–6. R″ is an aliphatic hydrocarbon group containing 1–10 carbon atoms.

The acid-ester intermediate is reacted wtih an aminopolyol having the structure $H_2N-R'-OH)_p$, wherein R′ is an aliphatic hydrocarbon group containing 2–6 carbon atoms having the valence p+1 and p is an integer from 2–6. Typical aminopolyols include 2-amino-2-ethyl-1,3-propanediol and trishydroxymethylaminomethane. Preferably, the aminopolyol is 2-amino-2-ethyl-1,3-propanediol.

The amount of aminopolyol necessary should be sufficient to react with the acid-ester intermediate formed by the reaction of the alcohol and dicarboxylic anhydride. Typically, from about 0.5 to about 2.5 moles of aminopolyol may be used per mole of halogenated dicarboxylic anhydride. Preferably, 0.8 to 2.0 moles of aminopolyol are used per mole of halogenated dicarboxylic anhydride. More preferably, about one mole of aminopolyol is used per mole of halogenated dicarboxylic anhydride.

The reaction should be carried out at a temperature high enough to allow the reaction to proceed, yet not so high as to cause degradation of the reactants and products. The preferred temperature range is from about 50° C. to about 350° C. A more preferred temperature range is from about 100° C. to about 250° C. An even more preferred temperature range is from 140° C. to 180° C.

In addition to the above stepwise procedure, the alcohol, halogenated dicarboxylic anhydride and aminopolyol may be added at the same time to form the combined reaction mixture. In this case, the alcohol functions almost exclusively as a solvent. The same quantities of the three reactants as indicated above are preferred.

The reaction product is the halogenated imide-containing polyol and the corresponding ether of the present invention. The halogenated imide-containing polyol and ether act as flame retardants when used both individually and in combination.

A flame retardant amount of the halogenated imide-containing polyol and ethers of the present invention are incorporated into polyurethanes to impart flame retardant properties. These imide-containing polyols and ethers may be present in the final product in concentrations from about 2% to about 40%. They normally range from about 5% to about 20%.

The halogenated imide-containing polyol and ether, when combined with a polyisocyanate react to form a composition useful in the preparation of a fire-retardant, self-extinguishing polyurethane. Additional components may be used in the preparation of a polyurethane foam. These include a non-halogenated polyol, a catalyst, a blowing agent and a surfactant.

The polyisocyanates used in the manufacture of polyurethanes are known to the art and any of these reactants are suitably employed in producing the flame-retardant composition of this invention. Combinations of polyisocyanates may also be used. Typical examples of suitable polyisocyanates for use in preparing the flame-retardant polyurethanes of this invention are:
1,6-hexamethylene diisocyanate,
1,4-tetramethylene diisocyanate,
m-phenylene diisocyanate,
1-methoxyphenyl-2,4-diisocyanate,
4,4′,4″-triphenylmethane trisocyanate,
4,4′-dimethyldiphenylmethane-2,2,5,5′-tetraisocyanate,
toluene diisocyanate and
methylene-bis(phenylisocyanate).

The amount of polyisocyanate employed varies slightly depending upon the nature of the polyurethane being prepared. In general, the polyisocyanates are employed in amounts that provide from 80 to 150 percent, preferably from 90 to 120 percent of the stoichiometric amount of the isocyanate groups required to react with all of the reactive hydrogen atoms present on hydroxyl groups or amino groups of the other reactants of the polyurethane-producing reaction mixture, including the hydroxyl groups of the halogenated imide-containing polyol and ether described herein.

In producing the flame retardant polyurethanes of the present invention, one or more polyols in addition to the halogenated imide-containing polyols and ethers of the present invention, are optionally employed in the reaction with the organic polyisocyanate. Any suitable polyhydric alcohol including both aliphatic and aromatic may be used, such as polyether polyols and mixtures of polyether polyols and poly(ethylene glycol) adducts of pentaerythritol, sucrose, sorbitol, alphamethylglucoside, butane-diol, trimethylolpropane, and the like.

Any of the conventional catalysts employed in polyurethane technology can be used. Some examples of useful catalysts which can be employed are tertiary amines, such as tetramethyl-1,3-butane diamine, triethylene diamine, triethanolamine, N-methylmorpholine, N-ethylmorpholine, tribenzylamine, N,N-dimethylbenzylamine, as well as tin compounds, such as dibutyl tin dilaurate, stannous oleate, stannous octoate, and others.

Polyurethanes are used in both the unfoamed and the so-called foam form. In general, a foamed polyurethane is produced when low boiling liquids or gaseous blowing agents, are incorporated into, or generated by, the polyurethane-foaming reactants. Blowing agents which may be employed in the preparation of foamed polyurethanes include, for example, water either alone or admixed with other compounds, such as an aqueous solution of the catalyst. When water is employed, it reacts with an excess of the isocyanate to generate carbon dioxide, thereby resulting in a foam. Other useful blowing agents include the chlorinated and fluorinated alkanes having from one to about three carbon atoms, such as the chlorofluoromethanes, the chlorofluoroethanes and the chlorofluorobutanes. The amount of blowing agents employed can be varied over a wide range as is well known to those skilled in the art depending primarily upon the density desired in the foam product.

A wetting agent or surface-active agent is generally necessary for production of high grade polyurethane foam since the foams may collapse or contain very large uneven cells. Numerous wetting agents have been found satisfactory. Non-ionic surfactants are preferred. Examples of common surface active agents include silicone compounds, silicone oil mixtures and the polyethylene glycol ethers of long chain alcohols. For most applications, the surfactant is employed in an amount equal to from about 1.5 to about 2.5 parts by weight per 100 parts by weight of the polyol blend in the foam-forming compositions.

Solvents are not necessary in the preparation of polyurethanes. However, suitable solvents include aromatic hydrocarbons such as benzene, xylene, toluene; the various chlorinated benzenes such as chlorobenzene; dimethoxyethylene glycol; dimethylformamide; or any other normally liquid material which is also liquid within the above-mentioned temperature range and non-reactive under the reaction conditions. The reaction is usually carried out at substantially atmospheric pressure.

The flame-retarded urethane polymers of this invention can take the form of foamed products, elastomers, surface coatings and the like. They may be formed in accordance with any of the processing techniques known to the polyurethane art such as the prepolymer, quasi-prepolymer and "one-shot" techniques.

In the prepolymer technique, all the polyol to be used in the formulation is pre-reacted with the isocyanate at any time prior to foaming. This results in a high viscosity, high molecular weight product dissolved in a slight excess of isocyanate. The reaction may be carried out at room temperature, with the addition of catalyst or by cooking. The prepolymer is foamed by the addition of water, usually in the presence of amine catalyst, surface active agents and emulsifiers.

In the quasi-polymer approach, part of the polyol to be used in the formulation is pre-reacted with all of the isocyanate. The resultant product is isocyanate terminated. Foams are prepared by adding water, catalyst, surface active agents and the remaining polyol. The quasi-prepolymer approach finds wide use in the marketplace today particularly in microcellular foams.

Virtually all large volume production of flexible polyurethane foams today utilizes the one-shot approach where all the reactants are added simultaneously at the time of foaming. For ease of metering, components which do not react are frequently pre-blended to cut down the number of streams which must be used.

The halogenated imide-containing polyols and ethers of the present invention are chemically bonded within the polyurethane structure by reaction of its hydroxy groups with isocyanate groups. The halogenated imide unit which is bonded into the polyurethane has the structure:

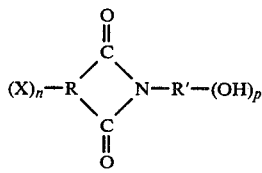

wherein R is a hydrocarbon group having the valence n+2 and is selected from the group consisting of benzene groups, naphthalene groups and alicyclic hydrocarbon groups containing 5 to 10 carbon atoms, R' is an aliphatic hydrocarbon group containing 3-12 carbon atoms, X is selected from the group consisting of bromine and chlorine, n is an integer from 1-6 and p is an integer from 2-6.

Along with the reactive flame retardant mixtures of the present invention synergists may be employed in the preparation of the polyurethane compositions of the present invention. Inorganic synergists include antimony oxide, zinc oxide, zinc borate, and the like. Examples of organic synergists are tris-2-chloroethylphosphate, tris-2,3-dibromo-propylphosphate, polyammonium phosphate, and the like.

The following examples illustrate the nature of the invention. The term acid number refers to the number of milligrams of potassium hydroxide required to neutralize one gram of product.

EXAMPLE I

A mixture of 50 ml. isopropyl alcohol and 46.4 g tetrabromophthalic anhydride was brought to reflux. A solution of 11.9 g 2-amino-2-ethyl-1,3-propanediol in 50 ml of isopropyl alcohol was then added over a period of thirty minutes. After refluxing for twenty-two hours the solution was evaporated to dryness to give 64.8 g of residue with an acid number of 20. A 3.7 g sample was heated in an oven at 140° C. for twenty-four hours to give a substance with an acid number of 2.7. Another sample was heated at 150° C. for twenty-four hours to give a substance with an acid number of 2.8. After oven heating the mixture contained 2-[1,1-bis(hydroxymethyl)propyl]4,5,6,7-tetrabromo-1H-isoindole-1,3(2H)-dione and 2,2'-[oxybis[1-ethyl-1-(hydroxymethyl)-2,1-ethanediyl]]bis[4,5,6,7-tetrabromo-1H-isoindole-1,3(2H)-dione]. Infrared spectroscopy indicated the the presence of an ether linkage.

EXAMPLE II

A mixture of 0.52 g of potassium carbonate, 100 ml. of isopropyl alcohol and 47.6 g of 2-amino-2-ethyl-1,3-propanediol was heated to 70° C. Then 185.6 g of tetrabromophthalic anhydride was added to the mixture and refluxed for four hous. After cooling to 25° C., the contents were poured into a glass dish and placed in a forced air oven at 150° C. for two days. A residue of 247.8 g which had an acid number of 24.6 was left.

A 60 g sample was heated at 140° C. for six hours to give a 55.3 g residue (101% yield) acid number 13.6.

A 60 g sample was heated at 160° C. for six hours to give a 51.8 g residue (94.7% yield) acid number 2.9, hydroxyl number 161.3.

A 60 g sample was heated to 180° C. for six hours to give a 51.0 g residue (93.2% yield), acid number 3.3, hydroxyl number 111.7.

After oven heating the mixture contained 2-[1,1-bis(-hydroxymethyl)propyl]-4,5,6,7-tetrabromo-1H-isoindole-1,3(2H)-dione and 2,2'-[1-ethyl-1-(hydroxymethyl)-2,-ethanediyl]]-bis[4,5,6,7-tetrabromo-1H-isoindole-1,3(2H)-dione].

EXAMPLE III

The procedure in Example II was repeated except that the whole reaction product was heated at 160° C. for five hours to give a product with an acid number of 2.8 and a hydroxyl number of 118.0. The mixture was identified as 2-[1,1-bis(hydroxymethyl)propyl]-4,5,6,7-tetrabromo-1H-isoindole-1,3(2H)-dione and 2,2'-[1-ethyl-1(hydroxymethyl)-2,-ethanediyl]]bis[4,5,6,7-tetrabromo-1H-isoindole-1,3(2H)-dione]. This product was evaluated in a polyurethane foam.

EXAMPLE IV

State of the art flame retardant polyol.

A mixture of 111.4 g 2-hydroxyethyl ether and 1.9 g potassium carbonate was charged in a one liter resin kettle. The content was heated to 130°–135° C. and then 463 g of tetrabromophthalic anhydride was gradually added over 35 minutes. The mixture was held at 130°–135° C. for thirty minutes and then 96.5 g of propylene oxide was added over two hours and twenty minutes. The reaction was held at 130°–135° C. for two hours. The product had an acid number of 0.1, and hydroxyl number of 178.7. A product mixture was obtained which contained 2-(hydroxyethoxy)-ethyl 2-hydroxy-propyltetrabromophthalate.

EXAMPLE V

Plurocol 480 refers to a polyol of hydroxyl number 399 available from BASF.

Niax L-520 refers to a silicone surfactant available from Union Carbide Corporation.

TMBDA refers to an amine catalyst available from Union Carbide Corporation.

Mondur MR refers to methylene diphenyleneisocyanate available from Mobay.

Freon 113 refers to a blowing agent available from DuPont.

The foams prepared in Examples V–VII have an isocyanate index of 105. This is the percentage of the ratio of the actual amount of isocyanate used in the formulation to the theoretical amount required. An isocyanate index of 105 indicates that an extra 5% of isocyanate was used.

No flame retardant polyol was present in Example V. A foam forming composition was prepared comprising on a parts by weight basis:

Plurocol 480: 100
Water: 0.5
Niax L-520: 1.0
TMBDA: 0.6
Mondur Mr: 107.7
Freon 113: 4.0

The polyol, surfactant, blowing agent, amine catalyst and water were weighed and charged into a cardboard container. The mixture was blended for 45 seconds with an electric mixer. The isocyanate component was then weighed and added to the mixture. Blending continued until the mixture appeared creamy. The creamy mixture was then transferred to a larger cardboard container where the foam was allowed to rise. The entire procedure was carried out at room temperature.

EXAMPLE VI

A state of the art flame retarded foam was prepared by incorporating the flame retardant polyol from Example IV into a polyurethane foam. The foam forming composition was prepared as indicated in Example V. The flame retardant polyol was added in place of a portion of the Plurocol 480.

The foam forming composition was comprised of:
Plurocol 480: 80
Polyol from Example IV: 20
Water: 0.5
Niax L-520: 1.0
TMBDA: 0.6
Mondur Mr: 96.0
Freon 113: 4.0

EXAMPLE VII

The halogenated imide-containing polyol from Example III was incorporated into a polyurethane foam. The foam forming composition was prepared as indicated in Example V. The halogenated imide-containing polyol of the present invention was added in place of a portion of the Plurocol 480.

The foam forming composition was comprised of:
Plurocol 480: 83
Polyol From Example III: 17
Water: 0.5
Niax L-520: 1.0
TMBDA: 0.6
Mondur Mr: 96.0
Freon 113: 4.0

COMPARISON OF FOAM PROPERTIES

The following table is a comparison of the flame retardant properties of the foams prepared in Examples V, VI and VII by ASTM D-1692 which is a small-scale horizontal laboratory screening procedure for measuring the rate of burning or extent of burning of rigid or flexible cellular plastics such as polyurethane foams. The Oxygen Index Test is defined as the minimal volume fraction of oxygen in a slowly rising gaseous atmosphere that will sustain the candlelike burning of a stick of polymer. The higher the Oxygen Index of a molded article, the more flame retardant it is.

| Foam | Foam Density, Pcf | Oxygen Index | ASTM-D-1692 Avg. Extent Of Burning, in. | Avg. Time Of Burning |
|---|---|---|---|---|
| Example V | 4.8 | 23.8 | 5 | 147 sec. |
| Example VI | 4.8 | 24.2 | 2 | 42 sec. |
| Example VII | 5.5 | 25.1 | 1 | 25 sec. |

Example VII, which employs the halogenated imide-containing polyol and ether of the present invention, exhibits the greatest flame retardant effectiveness.

I claim:

1. A reactive flame retardant mixture comprising about 1–99 weight percent of a halogenated imide-containing polyol having the formula:

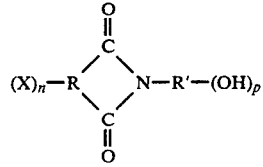

and about 99–1 weight percent of the corresponding ether having the formula:

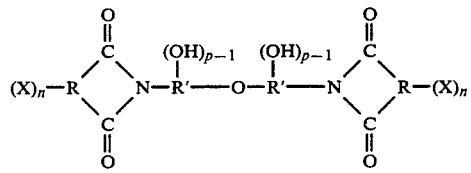

wherein R is a hydrocarbon group having the valence n+2 and is selected from the group consisting of benzene groups, naphthalene groups and alicyclic hydrocarbon groups containing 5 to 10 carbon atoms, R' is an aliphatic hydrocarbon group containing 3–12 carbon atoms, X is selected from the group consisting of bromine and chlorine, n is an integer from 1–6 and p is an integer from 2–6.

2. A reactive flame retardant mixture, as recited in claim 1, wherein R' is an aliphatic hydrocarbon group containing 5 carbon atoms and p is 2.

3. A reactive flame retardant mixture, as recited in claim 2, wherein R is benzene, X is bromine and n is 4.

4. A reactive flame retardant mixture, as recited in claim 3, wherein the halogenated imide-containing polyol has the formula:

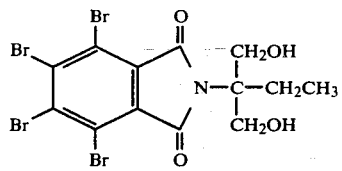

and the corresponding ether has the formula:

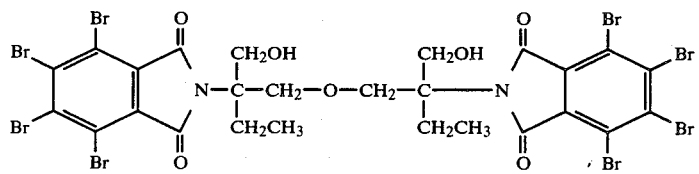

5. A reactive flame retardant mixture, as recited in claim 2, wherein R is 5-norbornene, X is chlorine and n is 6.

6. A reactive flame retardant mixture, as recited in claim 5, wherein the halogenated imide-containing polyol has the formula:

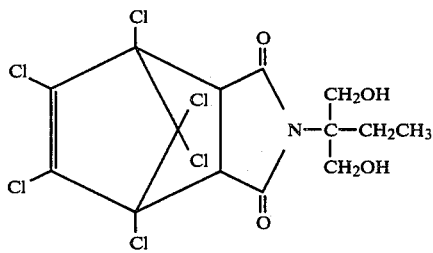

and the corresponding ether has the formula:

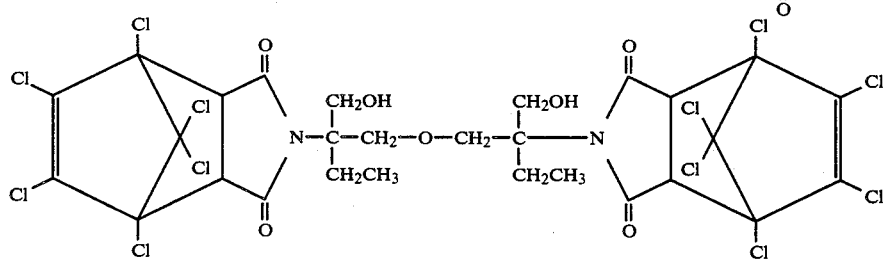

7. A process for preparing a reactive flame retardant mixture, said process comprising reacting at a temperature of about 50°–350° C.

(a) about one mole of a halogenated dicarboxylic anhydride compound having the structure:

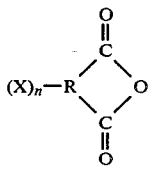

wherein R is a hydrocarbon group having the valence n+2 and is selected from the group consisting of benzene groups, naphthalene groups and alicyclic hydrocarbon groups containing 5 to 10 carbon atoms, X is selected from the group consisting of bromine and chlorine and n is an integer from 1 to 6, (b) about 0.8–50 moles of an alcohol containing 1–10 carbon atoms and (c) about 0.5–2.5 moles of an aminopolyol having the structure:

$$H_2N-R'-OH)_p$$

wherein R' is an aliphatic hydrocarbon group containing 2–6 carbon atoms having the valence p+1 and p is an integer from 2–6.

8. A process for preparing a reactive flame retardant mixture, as recited in claim 7, wherein said alcohol is isopropyl alcohol, said halogenated dicarboxylic anhydride is tetrabromophthalic anhydride and said aminopolyol is 2-amino-2-ethyl-1,3-propanediol.

9. A process for preparing a reactive flame retardant mixture, said process comprising reacting at a temperature of about 50°–350° C.

(a) about one mole of a halogenated dicarboxylic anhydride compound having the structure:

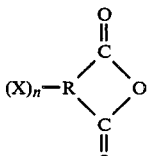

wherein R is a hydrocarbon group having the valence n+2 and is selected from the group consisting of benzene groups, naphthalene groups and alicyclic hydrocarbon groups containing 5 to 10 carbon atoms, X is selected from the group consisting of bromine and chlorine and n is an integer from 1 to 6 and (b) about 0.8–50 moles of an alcohol containing 1–10 carbon atoms to form an acid-ester intermediate and reacting said intermediate with (c) about 0.5–2.5 moles of an aminopolyol having the structure:

$$H_2N-R'-OH)_p$$

wherein R' is an aliphatic hydrocarbon group containing 2–6 carbon atoms having the valence $p+1$ and p is an integer from 2–6.

10. A process for preparing a reactive flame retardant mixture, as recited in claim 9, wherein said alcohol is isopropyl alcohol, said halogenated dicarboxylic anhydride is tetrabromophthalic anhydride and said aminopolyol is 2-amino-2-ethyl-1,3-propanediol.

* * * * *